Figure 11:
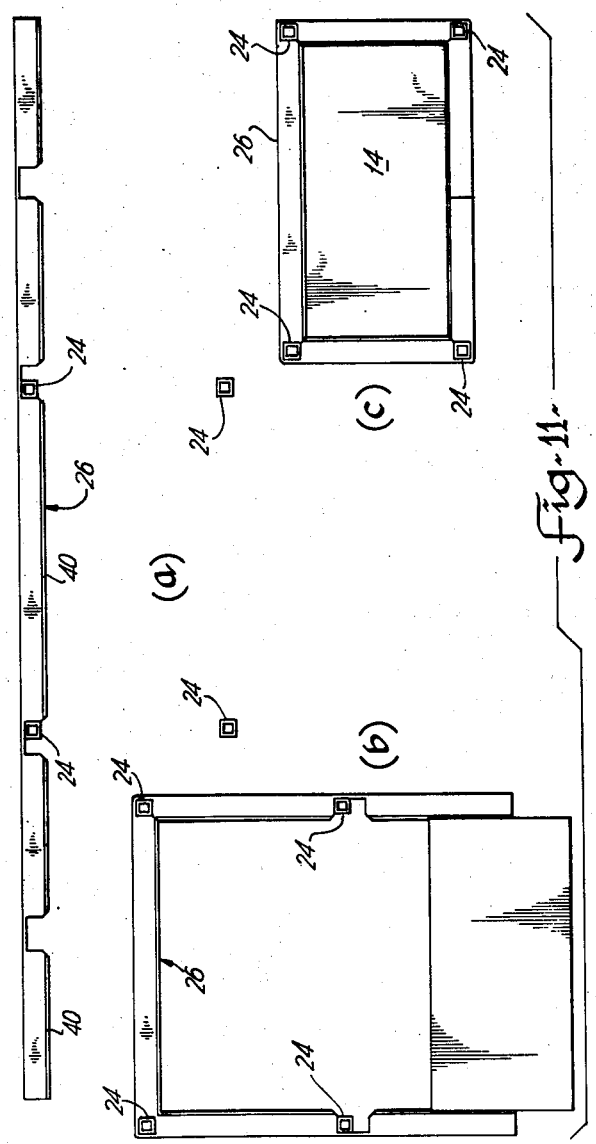

United States Patent [19]

Graves

[11] 4,066,022

[45] Jan. 3, 1978

[54] SHELF STRUCTURE AND METHOD OF MAKING SAME

[76] Inventor: Arthur H. Graves, R.R. #1, Kingston, Ontario, Canada

[21] Appl. No.: 681,409

[22] Filed: Apr. 29, 1976

[30] Foreign Application Priority Data

July 17, 1975 Canada .................................. 231673

[51] Int. Cl.² ............................................. A47B 85/00
[52] U.S. Cl. ......................................... 108/14; 108/59
[58] Field of Search ................ 108/59, 106, 107, 156, 108/157, 159, 111, 144, 14; 211/134

[56] References Cited

U.S. PATENT DOCUMENTS

| | | | |
|---|---|---|---|
| 2,503,565 | 4/1950 | Schmidt .............................. | 108/159 |
| 3,496,888 | 2/1970 | Scrimgeour ....................... | 108/59 X |
| 3,749,343 | 7/1973 | Marschak ......................... | 211/134 X |
| 3,754,728 | 8/1973 | Bowman ............................ | 108/156 X |
| 3,851,600 | 12/1974 | Kohl ..................................... | 108/144 |
| 3,964,404 | 6/1976 | Mueller et al. ...................... | 108/144 |

Primary Examiner—Roy D. Frazier
Assistant Examiner—Darrell Marquette
Attorney, Agent, or Firm—Stevens, Davis, Miller & Mosher

[57] ABSTRACT

The invention discloses a shelf structure and the method of making it. A specific embodiment is a linen cart having four corner posts, a plurality of horizontal, shelf retaining members and shelves held within the confines of the horizontal members. The horizontal members are welded to the corner posts and the device is devoid of any normal form of fastening means.

3 Claims, 11 Drawing Figures

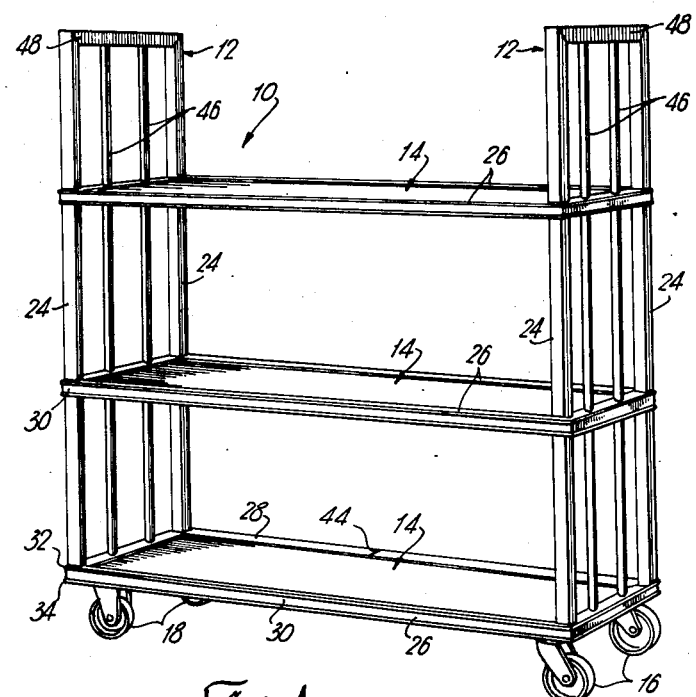
Fig-1-
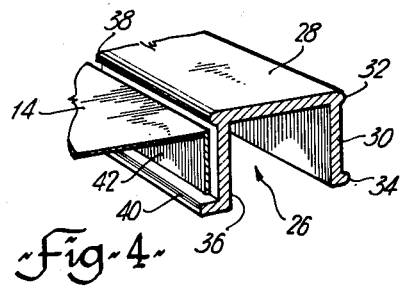
Fig-4-

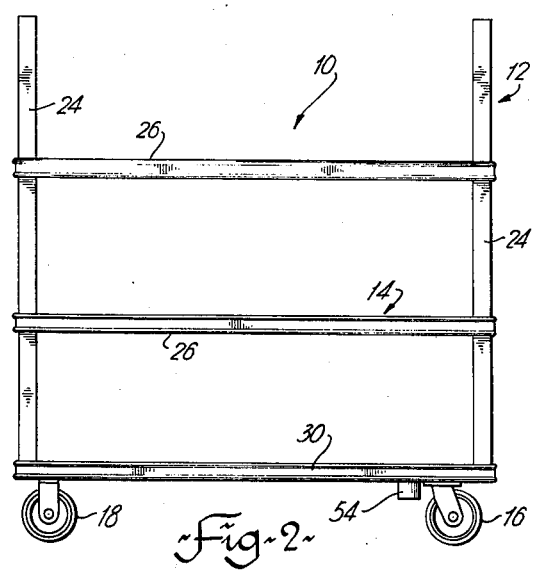
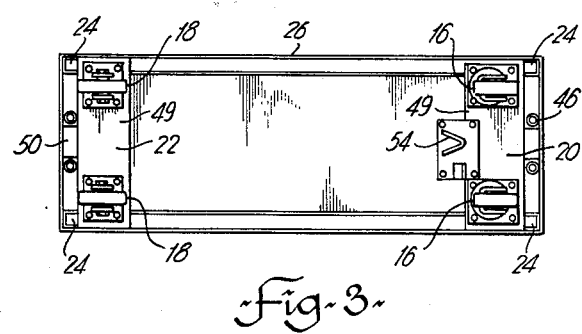

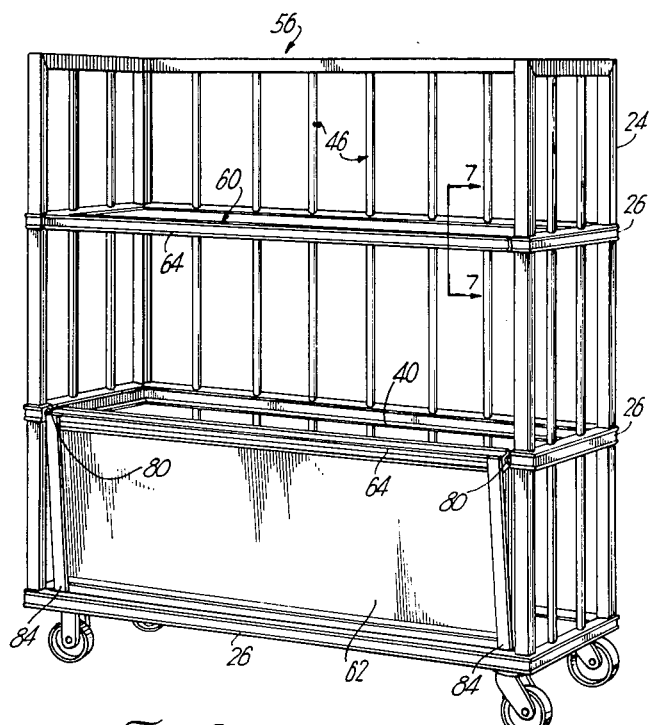
Fig-5-
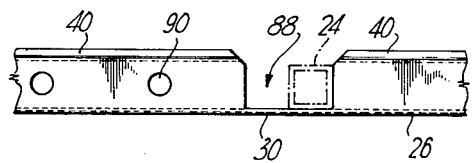
Fig-10-

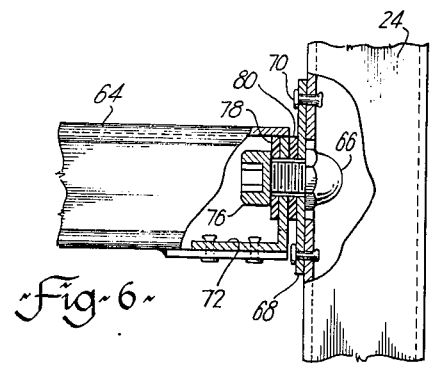
Fig-6-
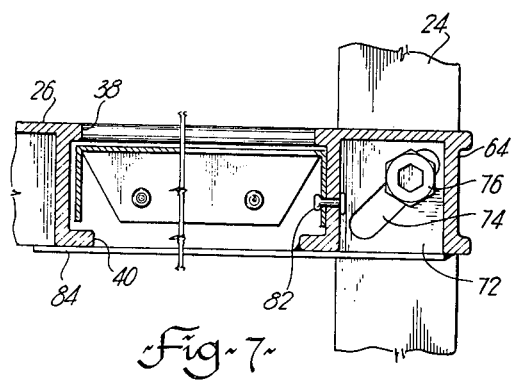
Fig-7-

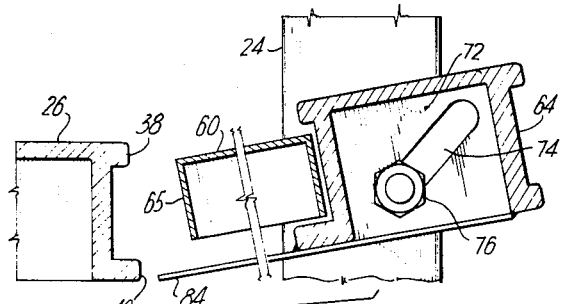
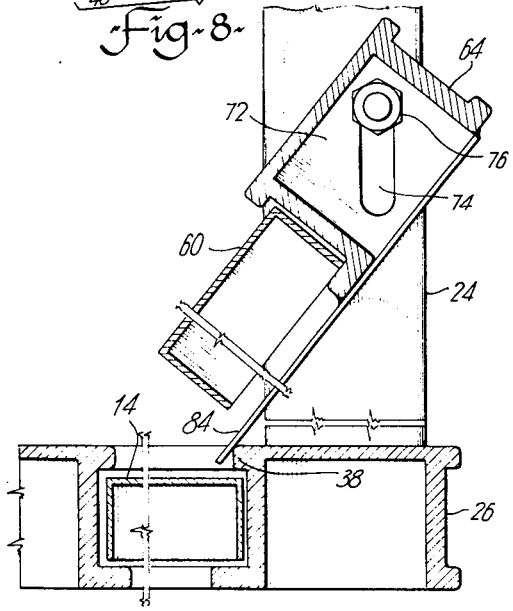

SHELF STRUCTURE AND METHOD OF MAKING SAME

This invention relates to the structure of shelving and in particular to mobile shelves for any industrial use.

The examples of the invention shown by this disclosure are directed to mobile carts used for the transportation of linen. Linen carts have been in use for several years in servicing various types of institutions such as hospitals. However, known carts are heavily constructed and difficult to maneouver and, after repeated use, require frequent servicing to maintain acceptable structural rigidity. The structure according to the present invention provides a strong, light alternative to the above-mentioned prior art and is exemplified in a light metal, all welded construction of heretofore unknown rigidity. In mobile form, the invention provides an open sided linen cart which may, in one example, be quickly converted to a bin cart for the transportation of linen to and from regional laundries.

According to its broadest aspect, the invention relates to a shelf structure having a frame and at least one shelf therein, said frame comprising four vertical corner posts and a horizontally disposed rail locating and weldably secured to the posts to form a rigid, spaced structure, and means on said rail captively enclosing said shelf therein.

In accordance with another aspect, the invention relates to a shelf structure including a frame and a plurality of shelves therein, said frame comprising four vertical tubular corner posts of rectangular cross section with a plurality of horizontally disposed, spaced rail members defining the perimeter of said structure and being welded to said posts to interconnect them together to form a rigid frame; said frame being elongated and rectangular in form having at least an open front portion and end portions; said rail members each being of inverted U-shape in cross section with a cap portion and integrally formed outer and inner depending flanges, portions of said cap being cut away to allow positioning therein of the corner posts and whereby the outer flange of the rail is wrapped around the exterior of said post; tubular end closure members, parallel with the corner posts, in the ends of the structure and extending upwardly through the cap of each rail and being secured to at least one thereof; the inner flange of each rail having inwardly extending lower and upper ribs; and a shelf positioned within the confines of the rail with edges of the shelf being held against vertical movement relative to the rail by said upper and lower ribs.

In accordance with a further aspect, the invention relates to a shelf structure including a frame and a plurality of shelves therein, said frame comprising four vertical tubular corner posts of rectangular cross section with at least two horizontally disposed, spaced rail members defining the perimeter of said structure and being welded to said posts to interconnect them together to form a rigid frame; said frame being elongated and rectangular in form having at least an open front portion and end portions; said rail members each being of inverted U-shape in cross section with a cap portion and integrally formed outer and inner depending flanges, portions of said cap being cut away to allow positioning therein of the corner posts and whereby the outer flange of the rail is wrapped around the exterior of said post; tubular closure members, parallel with the corner posts, in the ends of the structure and extending upwardly through the cap of each rail and being secured to at least one thereof; the inner flange of each rail having inwardly extending lower and upper ribs; and a shelf positioned within the confines of the rail with edges of the shelf being held against vertical movement relative to the rail by said upper and lower ribs; the uppermost rail having a first portion extending around three sides of said structure and a second portion pivotally mounted along the other side between two corner posts, said pivotal mounting comprising angular slots in the terminal ends of said second rail portion, and pivot pins secure in said posts and extending into said slots; and a shelf secured to said second portion whereby movement of the second portion by means of said slots on said pins effects pivotal movement of said shelf downwardly to close off the fourth side of said structure.

The invention is illustrated, by way of example, in the accompanying drawings wherein:

FIG. 1 is a perspective view of a mobile linen cart;
FIG. 2 is a side elevation of the cart shown in FIG. 1;
FIG. 3 is a bottom view of a cart;
FIG. 4 is a fragmentary view in perspective of the shelf construction;
FIG. 5 is a perspective view of a mobile shelf unit in bin cart form;
FIG. 6 is a fragmentary cross section of a pivotal shelf construction in the unit of FIG. 5;
FIG. 7 is a cross sectional view taken at line 7—7 of FIG. 5;
FIGS. 8 and 9 are viewed from the same location as FIG. 7 but illustrate sequential movement of a shelf in the cart of FIG. 5;
FIG. 10 illustrates a section of rail during the manufacture of the structure, and
FIG. 11 schematically shows the main manufacturing steps.

In cart form, the structure is adapted for use in a modular transportation and washing system wherein a given number of carts are loaded onto a van for delivery from and back to a regional laundry. In such a system the carts are drawn through a wash system after each use for purposes of sterilization. Therefore, the length and width of the cart will vary to suit the size of van and wash system in use.

Referring to FIGS. 1, 2 and 3, the invention is shown as an "open" linen cart 10 having ends 12 and shelves generally indicated at 14. Casters 16, 18 are secured on dollies 20, 22 as shown in FIG. 3.

The structure includes four vertical corner posts 24, preferably formed of hollow aluminum tubing. Posts 24 are interconnected by means of horizontally disposed rail members 26 which are welded to the posts in a manner to be described. As shown in FIG. 4, the rail 26 is preferably in the form of an aluminum extrusion and comprises a top portion or cap 28 having a depending outer flange 30 with outwardly facing ribs 32, 34 and a depending inner flange 36 having inwardly projecting top and bottom ribs 38 and 40. It will be seen from FIG. 4 that the shelves 14 comprise aluminum sheet having a depending flange 42 somewhat shorter than the distance between ribs 38 and 40 between which flange 41 and hence shift 14, is captively enclosed. Briefly the rails 26 are "wrapped" around posts 24 and welded at 44 for example, and during this construction and prior to such welding, the shelf 14 is placed into the position shown. If required, the ends of the cart 10 may include closure tubes 46 which are secured in the lowermost rail 26 and extend upwardly for securing in cross members 48 welded to the upper ends of the end posts 24 as shown in FIG. 1.

FIG. 3 illustrates the location at which the posts 24 are welded to the rails 26 and where the bottom ends of the closure tubes 46 are also welded. The casters 16 and 18 are mounted on their respective dollies 20 and 22, each dolly having a frame comprising a planar metal base 48 with spaced tubular members 50 that drop into the confines of the rail 26 and which can be removably retained therein by bolts 52. The front dolly 20 includes a torque 54 for receiving a pin or the like to draw the cart 10 through a washing machine.

From the foregoing, it will be appreciated that a shelf structure has been disclosed wherein the shelves are captively retained in place by the horizontal rail members 26 which are welded to the posts 24 and wherein the outer flanges 30 of the rails extend around the outside of the posts.

FIG. 5 illustrates a further embodiment of the invention in the form of a bin cart 56 which differs from the open cart of FIG. 1 by way of closing off one of the open sides with additional closure tubes 58 and also by means of pivotally securing the shelves so that they can be set into an open position, as shown by the upper shelf 60, for the loading and transportation of linen to its destination and then to a position shown by the second shelf 62 which has been swung downwardly to close off a portion of the front side of the cart. With like positioning of the upper shelf 60, it will be appreciated that the cart can be converted into a bin for retaining dirty linen to a laundry along with the cart 56.

It will be noted from FIG. 5 that the two upper rails 26 extend around the posts 24 as in FIG. 1 but the front portions 64 are separate from the remainder of the rail 26. As shown in FIGS. 6-9, rail portion 64 is pivotally secured to post 24 for movement from the "shelf" position in FIG. 7 to the "bin" position of FIG. 9. FIGS. 6 and 7 show an acorn nut 66 positioned within the post 24 by means of a plate 68 secured to the post by welding or by pop rivets 70, an insert 72 is welded into the open end of the rail 64 and this insert is provided with a slot 74 angled at approximately 45°. A cap screw 76 is positioned inside the insert 72 and threaded into the acorn nut 66. Teflon washers 78 and 80 are placed between the cap screw 76 and insert 72 and between the latter and the plate 68.

In its "shelf" position of FIG. 7, the shelf 60, which is secured to the rail 64 by rivets 82, is held against vertical movement by the ribs 38 and 40 of the rail 26 along the back of the cart opposite the rail 64. A stop strip 84 is welded to the bottom of the rail 64. When it is desired to convert the structure to a bin cart as shown for example in the second shelf in FIG. 5, the rail 64 and its shelf 60 are drawn backwardly and upwardly, as shown in FIG. 8, by way of moving rail 64 and its insert 72 along the cap screw 76. This action pulls the opposite flange 65 of the shelf 60 out from the rib 40 of rail 26 and thereafter the rail 64 and shelf 60 are allowed to drop down to the FIG. 9 position where the rail 64 is suspended from the cap screw 76, the stop strip 84 engaging rib 38 on the lower rail 26 to prevent shelf 60 from pivoting outwardly of rail 26. In this position the surface of shelf 60 together with the closure bars 46 form a bin for the transport of linen to a laundry.

FIG. 10 shows a portion of a rail 26 prior to manufacture. The rail 26 is notched as at 88 to an area approximately that of a post 24, four such notches being required. Additionally, holes 90 are drilled for receiving the closure tubes 46. Referring to the schematic of FIG. 11, the method of manufacture is as follows:

a. rail material 26 is punched or drilled for closure tubing and the cap portion is notched for upright posts, b. rails 26 are laid in a jeg (not shown) and welded to the square posts 25 (FIG. 11a), c. the terminal ends of the rails 26 are turned upwards 90° bringing the notches full round the posts 24 and are welded thereto, d. shelves 14 are dropped into place between the ribs 38 (FIG. 11b), e. ends of rails 26 are brought to their final closing position and welded, (FIG. 11c), and f. the tubes 46 are dropped through the apertures provided for them (FIG. 10), their lower ends are flared and welded to the underside of the lowermost rail 26 as shown in FIG. 3.

The present disclosure has been directed to mobile linen carts by way of example. But, as mentioned earlier, the invention is applicable to any shelving structure, mobile or stationary. Accordingly, while this invention has been described in connection with specific embodiments thereof and in specific uses, various modifications thereof will occur to those skilled in the art without departing from the spirit and scope of the invention as set forth in the appended claims.

The terms and expressions which have been employed in this specification are used as terms of description and not of limitation and there is no intention in the use of such terms and expressions to exclude any equivalents of the features shown and described or portions thereof, but it is recognized that various modifications are possible within the scope of the invention claimed.

I claim:

1. A shelf structure including a frame and a plurality of shelves therein, said frame comprising four vertical tubular corner posts of rectangular cross section with a plurality of horizontally disposed, vertically spaced rail members defining the perimeter of said structure and being welded to said posts to interconnect them together to form a rigid frame; said frame being elongated and rectangular in form having at least an open front portion and end portions; said rail members each being of inverted U-shape in cross section with a cap portion and integrally formed outer and inner depending flanges, portions of said cap being cut away to allow positioning therein of the corner posts and whereby the outer flange of the rail is wrapped around the exterior of said post; tubular end closure members, parallel with the corner posts, in the ends of the structure and extending upwardly through the cap of each rail and being secured to at least one thereof, the inner flange of each rail having inwardly extending lower and upper ribs; and a shelf positioned within the confines of each rail member with edges of the shelf being held against vertical movement relative to each rail member by said upper and lower ribs.

2. A shelf structure according to claim 1 including caster dolly sub frames mounted in the lowermost rail member adjacent each end of the structure.

3. A shelf structure including a frame and a plurality of shelves therein, said frame comprising four vertical tubular corner posts of rectangular cross section with at least two horizontally disposed, vertically spaced rail members defining the perimeter of said structure and being welded to said posts to interconnect them together to form a rigid frame; said frame being elongated and rectangular in form having at least an open front portion and end portions; said rail members each being of inverted U-shape in cross section with a cap portion and integrally formed outer and inner depending flanges, portions of said cap being cut away to allow positioning therein of the corner posts and whereby the outer flange of the rail is wrapped around the exterior of said post; tubular closure members, parallel with the corner posts, in the ends of the structure and extending upwardly through the cap of each rail and being secured to at least one thereof; the inner flange of each rail having inwardly extending lower and upper ribs; and a shelf positioned within the confines of the upper rail member with edges of the shelf being held against vertical movement relative to the upper rail member by said upper and lower ribs; the lower rail member having a first portion extending around three sides of said structure and a second portion pivotally mounted along the other side between two corner posts, said pivotal mounting comprising angular slots in the terminal ends of said second rail portion, and pivot pins secure in said posts and extending into said slots; and a shelf secured to said second portion whereby movement of the second portion by means of said slots on said pins effects pivotal movement of said shelf downwardly to close off the fourth side of said structure.

* * * * *